Oct. 25, 1927.
S. WEBB
1,646,891
MILLING MACHINE
Filed Feb. 17, 1926
4 Sheets-Sheet 1
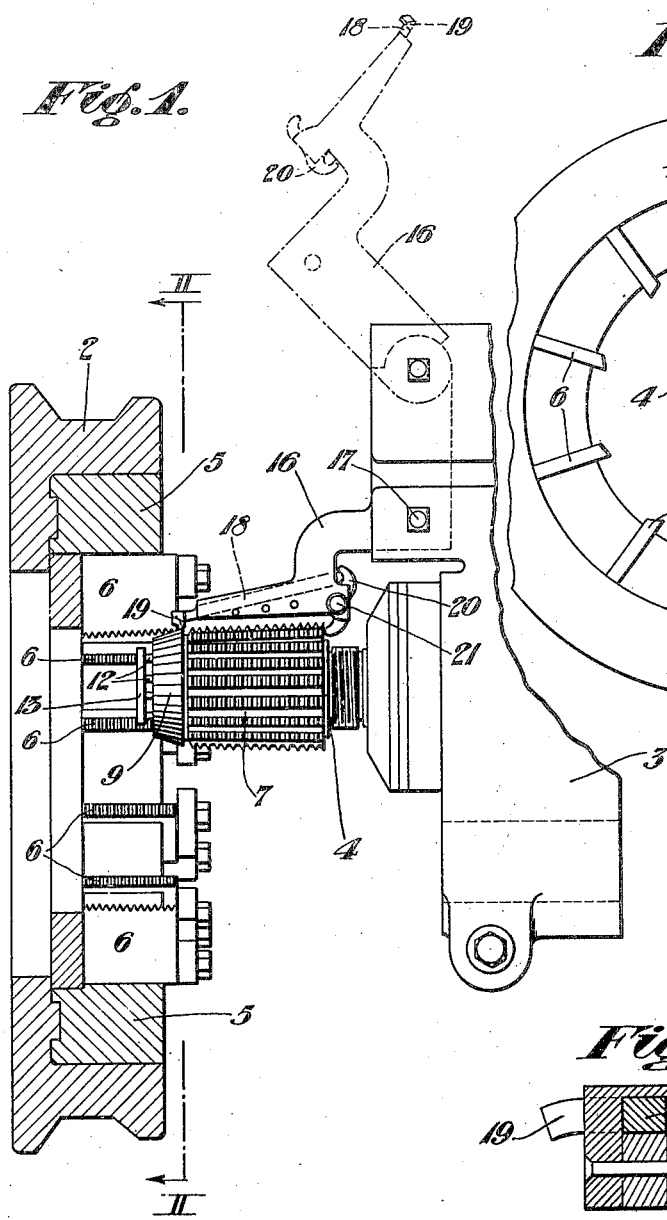
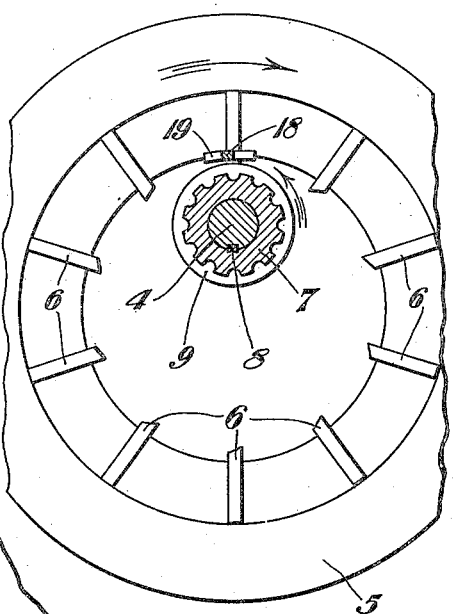
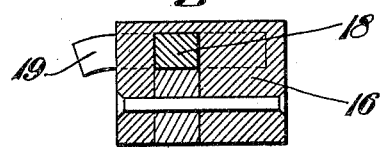
Witnesses:
Edwin Trueb
Inventor:
SAMUEL WEBB,
by D. Anthony Usina
his Attorney.

Oct. 25, 1927.  1,646,891
S. WEBB
MILLING MACHINE
Filed Feb. 17, 1926 4 Sheets-Sheet 2

Witnesses:
Edwin Trueb

Inventor:
SAMUEL WEBB,
By D Anthony Usina
his Attorney.

Oct. 25, 1927.

S. WEBB

MILLING MACHINE

Filed Feb. 17, 1926    4 Sheets-Sheet 3

1,646,891

Witnesses:
Edwin Trueb

Inventor:
SAMUEL WEBB,
by: Anthony Reina
his Attorney.

Oct. 25, 1927.
S. WEBB
1,646,891
MILLING MACHINE
Filed Feb. 17, 1926
4 Sheets-Sheet 4
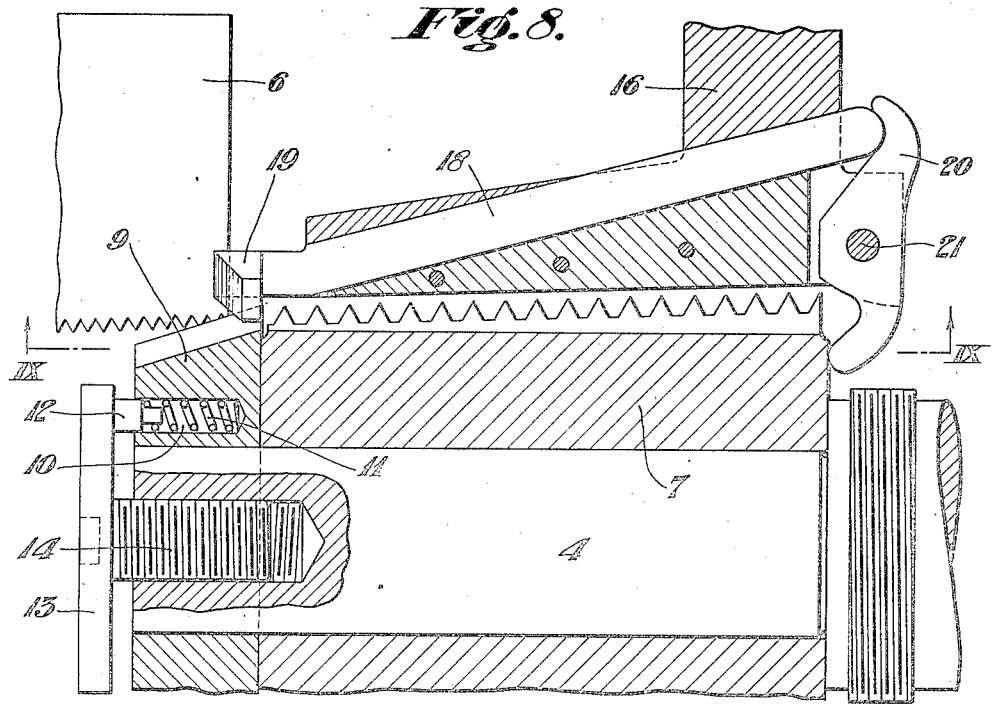
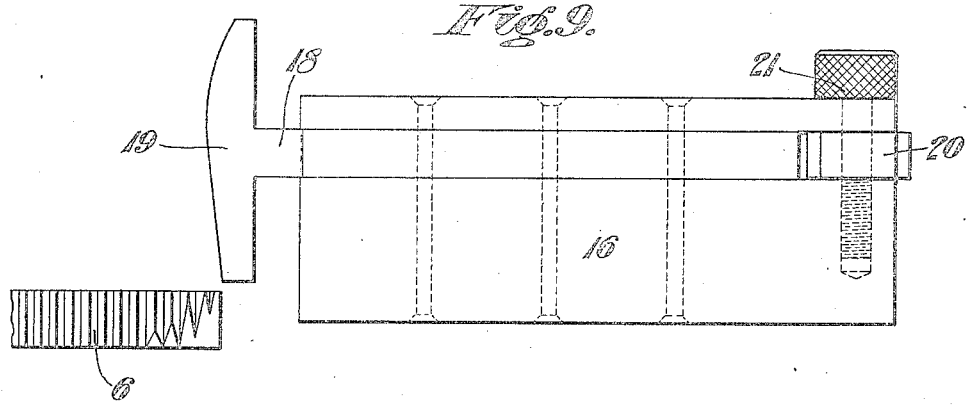
Witnesses:
Edwin Trueb
Inventor:
SAMUEL WEBB,
by D. Anthony Usina
his Attorney.

Patented Oct. 25, 1927.

1,646,891

UNITED STATES PATENT OFFICE.

SAMUEL WEBB, OF PITTSBURGH, PENNSYLVANIA, ASSIGNOR TO NATIONAL TUBE COMPANY, A CORPORATION OF NEW JERSEY.

MILLING MACHINE.

Application filed February 17, 1926. Serial No. 88,846.

This invention relates to milling machines and more particularly to a reamer attachment for cutting the lead and clearance on die segments and other threaded articles, and has for one of its objects the provision of such a device which will be controlled automatically thus producing a uniform lead and clearance on the threaded articles.

Another object is to provide a novel combination of mechanism which may be attached to a standard thread milling machine without materially changing its construction.

A further object is to provide an attachment composed of the novel design, construction and combination of parts hereinafter described and illustrated in the accompanying drawings.

In the drawings:

Figure 1 is a plan view, partly in section, of a portion of a milling machine, embodying my invention.

Figure 2 is a sectional view taken on the line II—II of Figure 1.

Figure 3 is a sectional view through the cam supporting arm.

Figure 8 is a sectional plan, through the milling head, showing the parts in relative position at the finish of the reaming operation.

Figure 9 is a view taken on the line IX—IX of Figure 8.

Figure 4:
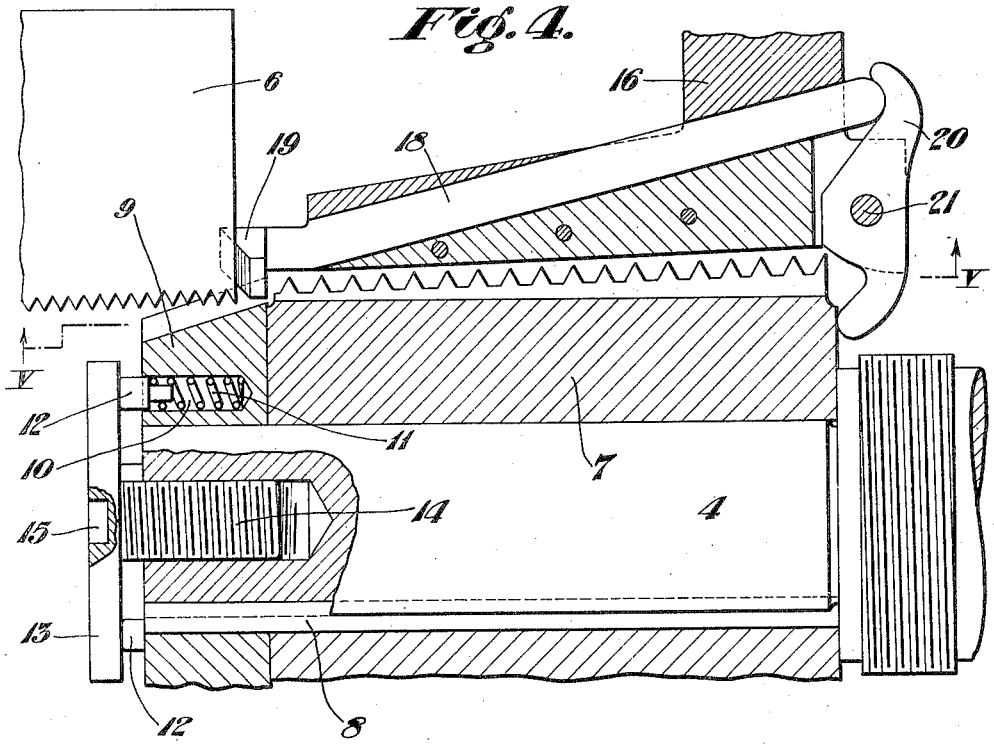
Figure 4 is a sectional plan, through the milling head, showing the parts in relative position just prior to the milling operation.
Figure 5:
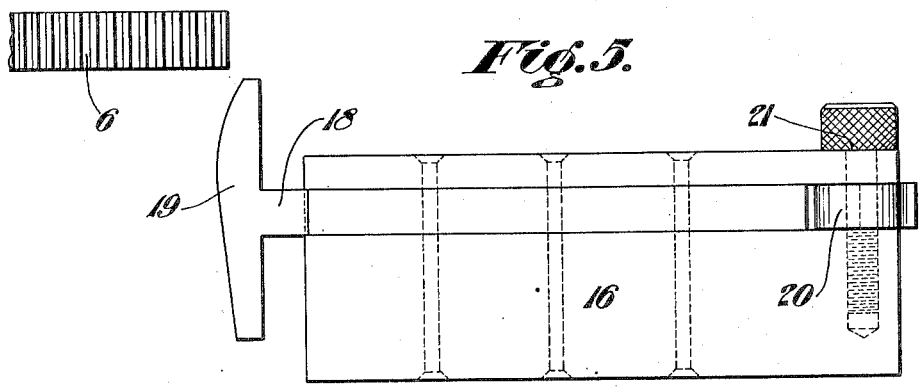
Figure 5 is a view taken on the line V—V of Figure 4.
Figure 6:
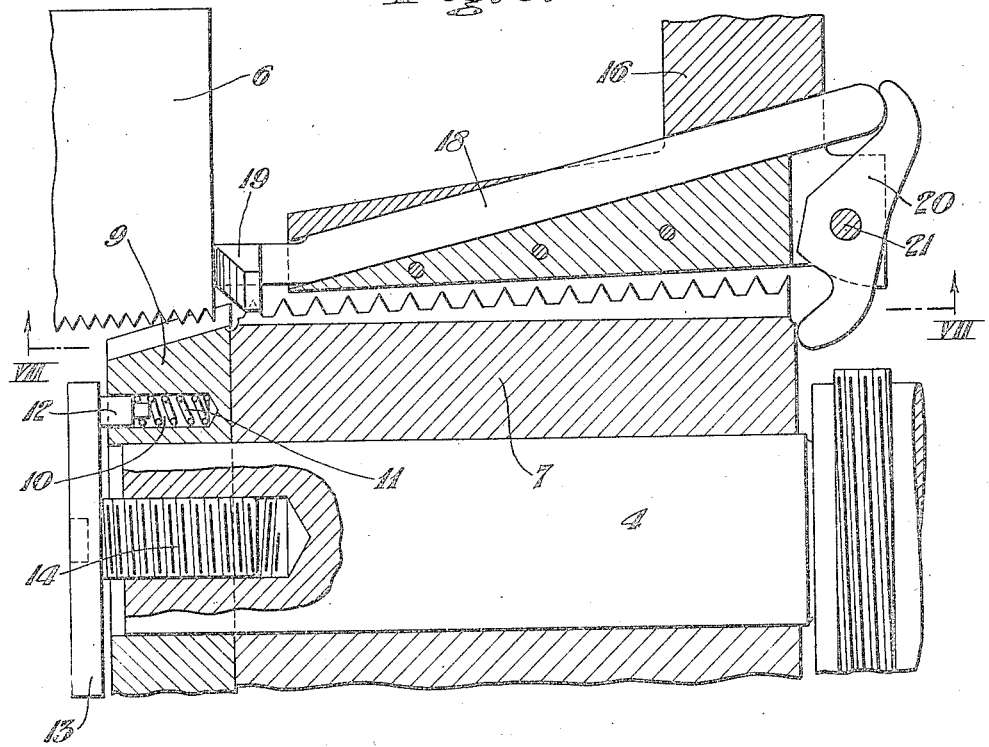
Figure 6 is a sectional plan, through the milling head, showing the parts in relative position at the center of the reaming operation.
Figure 7:
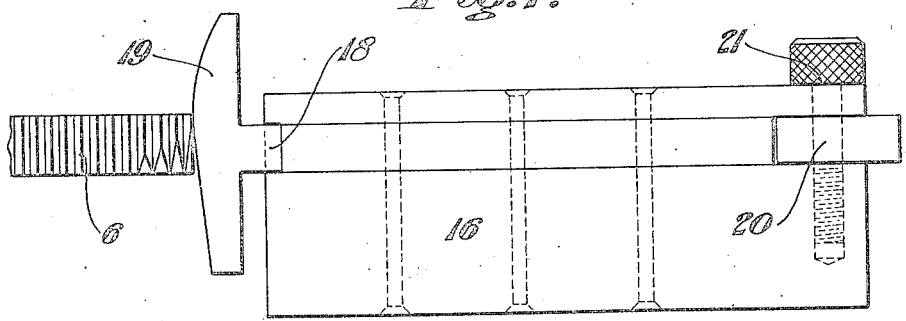
Figure 7 is a view taken on the line VII—VII of Figure 6.

Referring more particularly to the drawings, the numeral 2 designates the chuck, the numeral 3 the arbor carriage, and the numeral 4 the arbor spindle of a standard thread milling machine.

The present invention will be described in connection with the cutting of the lead and clearance on the die segments. A die 5 having spaced segments 6 is secured in the chuck 2 which is adapted to be rotated in the usual manner.

The usual thread milling hob 7 is mounted on the spindle 4 and held against rotation relative to said spindle by a key 8 so as to rotate with the spindle when it is rotated. The spindle 4 will be rotated in the usual manner.

A taper reamer 9 is also mounted on the spindle 4 and held against rotation relative to the spindle by the key 8. The forward face of the reamer 9 is provided with recesses 10 to receive springs 11 and pins 12, and a retaining plate 13, having a threaded shank 14 threaded in the spindle 4, is provided to limit the forward movement of the reamer and hob and to retain the springs 11 and pins 12 in position. The plate 13 is provided with a squared recess 15 in its forward face to receive a wrench to screw the plate up against the reamer to hold the reamer and hob against longitudinal movement during the thread cutting operation and to loosen or unscrew the plate to permit longitudinal movement of the reamer and hob during the cutting of the lead and clearance.

A supporting arm 16 is pivotally mounted in a recess in the arbor carriage 3 of the machine and is adapted to be swung into and out of operative position about its pivotal mounting and to be locked in operative position by a set screw 17.

A cam rod 18 having an integral cam head 19 is slidably mounted in an opening through the arm 16 and is adapted to engage one end of a rocker arm or lever 20 pivotally mounted at 21 on the arm 16. The other end of the rocker arm 20 is engaged with the rear face of the hob 7. The cam head 19 of the rod 18 is adapted to be engaged by the segments 6 when the arm 16 is in operative position and to cause a reciprocation of the rod 18 which in turn operates the rocker arm 20 and reciprocates the hob 7 and reamer 9.

The operation of this invention is as follows: Assuming that the die 5 is mounted in the chuck 2 and the machine is otherwise in readiness, the supporting arm 16 will be swung outwardly out of the path of the die segments, the arbor carriage will be moved and adjusted so that the reamer 9 is projected through the die, and the hob 7 is in position to mill the threads on the segments 6. After the threads are milled, the arbor carriage will be backed off and readjusted to position the reamer so that it will cut the proper amount of taper on the die segments, and the plate 13 will be unscrewed a sufficient distance to permit the reamer 9 and hob 7 to move longitudinally on the spindle 4. The supporting arm 16 will then be swung inwardly to operative position and locked in position by the set screw 17.

The machine will now be started to cut the lead and clearance on the die segments, and as the chuck rotates the die segments will be moved into contact with the cam head 19 of the cam rod 18 which will cause the rod 18 to first rock the rocker arm 20 to force the hob 7 and reamer 9 inwardly to cutting position and then control its retraction to form a perfect lead and clearance on the segment.

While I have shown and described only one specific form of my invention it will be understood that I do not wish to be limited thereto, since various modifications may be made without departing from the scope of my invention as defined in the appended claims.

I claim:

1. Means for cutting the lead and clearance on die segments comprising the combination with a milling machine having a chuck for holding the die segment, an arbor spindle, and means for rotating said chuck and spindle, of a thread cutting hob on said spindle, a reamer mounted on said spindle and adapted to rotate therewith, and means operable by the die segments carried by said rotating chuck for automatically moving said reamer longitudinally relative to said spindle and die segments while said reamer is being rotated.

2. Means for cutting the lead and clearance on die segments comprising the combination with a milling machine having a chuck for holding the die segment, a arbor spindle, and means for rotating said chuck and spindle, of a thread cutting hob on said spindle, a reamer mounted on said spindle and adapted to rotate therewith, resilient means for normally forcing said reamer rearwardly on said spindle, and means for automatically moving said reamer forwardly on said spindle and for controlling return by said resilient means while said reamer is being rotated to cut a lead and clearance on said die segments.

3. Means for cutting the lead and clearance on die segments comprising the combination with a milling machine having a chuck for holding the die segment, an arbor spindle, and means for rotating said chuck and spindle, of a thread cutting hob on said spindle, a reamer mounted on said spindle and adapted to rotate therewith, resilient means for normally forcing said reamer rearwardly on said spindle, and means for automatically moving said reamer forwardly on said spindle and for controlling return by said resilient means while said reamer is being rotated to cut a lead and clearance on said die segments, said means including a cam control member adapted to be actuated by the segment being cut.

4. The combination with a milling machine for cutting threads on die segments comprising the usual rotatable chuck for holding the die segments, an arbor carriage, rotating arbor and spindle on said carriage, of a hob mounted on said spindle and adapted to rotate therewith and to slide longitudinally thereof, a reamer mounted on said spindle in front of said hob for cutting the lead and clearance of the die segments, said reamer being adapted to rotate with said spindle and to slide longitudinally thereof, means for locking said hob and said reamer against longitudinal movement relative to said spindle during the thread cutting operation, said means being released to permit said hob and said reamer to move longitudinally during the cutting of the lead and clearance on the die segments, and means for automatically moving said reamer forwardly on said spindle to cut the lead on said die segments and to control the backing off of said reamer.

5. The combination with a milling machine for cutting threads on die segments comprising the usual rotatable chuck for holding the die segments, an arbor carriage, rotating arbor and spindle on said carriage, of a hob mounted on said spindle and adapted to rotate therewith and to slide longitudinally thereof, a reamer mounted on said spindle in front of said hob for cutting the lead and clearance of the die segments, said reamer being adapted to rotate with said spindle and to slide longitudinally thereof, means for locking said hob and said reamer against longitudinal movement relative to said spindle during the thread cutting operation, said means being released to permit said hob and said reamer to move longitudinally during the cutting of the lead and clearance on the die segments, and means for automatically moving said reamer forwardly on said spindle to cut the lead on said die segments and to control the backing off of said reamer, said last named means comprising a supporting arm pivotally mounted on said arbor carriage and adapted to be moved into and out of operative position, a cam rod slidably mounted in said supporting arm and adapted to be engaged by the segment being cut, and a rocker arm pivotally mounted on said supporting arm and adapted to be rocked by said cam rod so as to engage said hob and thereby control the longitudinal movement of said hob and said reamer.

6. The combination with a milling machine having a chuck for holding the workpieces to be machined, an arbor spindle, and means for rotating said chuck and spindle, of a reamer mounted on said spindle and adapted to move longitudinally relative to and to rotate with said spindle, and means operable by the work-pieces carried by said rotating chuck for automatically and positively moving said reamer longitudinally relative to said spindle and against said work-pieces while said reamer is being rotated.

7. The combination with a milling machine having a chuck for holding the work-pieces to be machined, an arbor spindle, and means for rotating said chuck and spindle, of a reamer mounted on said spindle and adapted to move longitudinally relative to and to rotate with said spindle, resilient means for normally forcing said reamer rearwardly on said spindle away from said work-pieces, and means operable by the work-pieces for automatically and positively moving said reamer forwardly on said spindle against said work-pieces and for controlling the return of said reamer by said resilient means while said reamer is being rotated to cut the work-pieces.

8. The combination with a milling machine for cutting threads on die segments comprising the usual rotatable chuck for holding the die segments, an arbor carriage, rotating arbor and spindle on said carriage, of a hob mounted on said spindle and adapted to rotate therewith and to slide longitudinally thereof, a reamer mounted on said spindle in front of said hob for cutting the lead and clearance of the die segments, said reamer being adapted to rotate with said spindle and to slide longitudinally thereof, means for locking said hob and said reamer against longitudinal movement relative to said spindle during the thread cutting operation, said means being released to permit said hob and said reamer to move longitudinally during the cutting of the lead and clearance on the die segments, resilient means for normally forcing said reamer and said hob rearwardly on said spindle during the cutting of the lead and clearance on the die segments, and means for automatically moving said reamer forwardly on said spindle to cut the lead on said die segments and to control the backing off of said reamer.

In testimony whereof, I have hereunto set my hand.

SAMUEL WEBB.